United States Patent [19]
Carmon et al.

[11] Patent Number: 5,960,360
[45] Date of Patent: Sep. 28, 1999

[54] COMMUNICATION METHOD

[75] Inventors: Rafael Carmon, Holon; Mark Shahaf, Ashdod; Eli Arviv, Ramat Hasharon, all of Israel

[73] Assignee: Motorola, Inc., Schaumburg, Ill.

[21] Appl. No.: 08/941,127

[22] Filed: Sep. 29, 1997

[30] Foreign Application Priority Data

Dec. 4, 1996 [GB] United Kingdom ............... 9625257

[51] Int. Cl.⁶ .................................................. H04Q 7/38
[52] U.S. Cl. .................... 455/518; 455/519; 455/520; 455/509; 370/347
[58] Field of Search .................................... 455/450, 509, 455/512, 517, 518, 519, 524, 426, 520; 370/340, 341, 347, 337

[56] References Cited

U.S. PATENT DOCUMENTS

| | | | |
|---|---|---|---|
| 4,833,701 | 5/1989 | Comroe et al. | 455/509 |
| 5,214,790 | 5/1993 | Kozlowski et al. | 455/518 |
| 5,515,366 | 5/1996 | Chieu et al. | 370/347 |
| 5,535,426 | 7/1996 | Leigh et al. | 455/520 |
| 5,666,661 | 9/1997 | Grube et al. | 455/509 |
| 5,781,860 | 7/1998 | Lopponen et al. | 455/426 |
| 5,822,682 | 10/1998 | Schroderus et al. | 455/63 |

FOREIGN PATENT DOCUMENTS

| | | |
|---|---|---|
| 2 287 612 | 9/1995 | United Kingdom . |
| 95/15666 A1 | 6/1995 | WIPO . |
| 95/32589 A2 | 11/1995 | WIPO . |

*Primary Examiner*—Wellington Chin
*Assistant Examiner*—Isaak R. Jama
*Attorney, Agent, or Firm*—Dale W. Dorinski

[57] ABSTRACT

A communication method is provided in which mobiles operating in a trunk mode operation transmit a message on a direct mode operation channel indicating a trunk mode operation connection is present. If a mobile outside the range of coverage of the trunking system receives the message it will deduce from the message the slot structure of the trunk mode channel and its timing, and will then be able to transmit a request for a direct mode connection on an appropriate slot of the trunk mode channel. Some or all of the mobiles operating in trunk mode will then be able to switch to direct mode to connect with the mobile outside the range of coverage.

3 Claims, 5 Drawing Sheets

SECOND DMO CALL ESTABLISHMENT

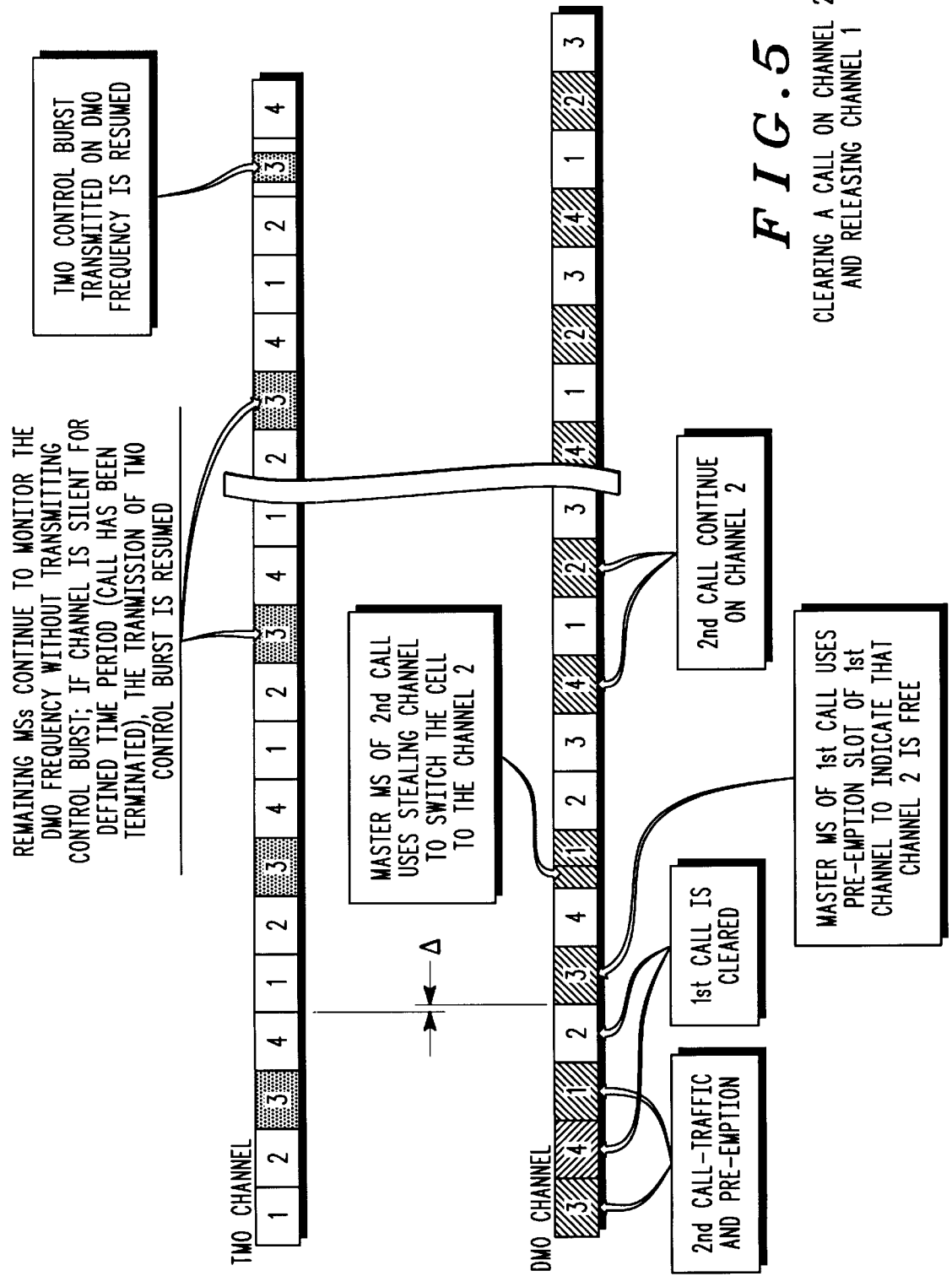

COMMUNICATION METHOD

FIELD OF THE INVENTION

This invention relates to a communication method for establishing a direct mode call between mobile stations in a radio communication system.

BACKGROUND OF THE INVENTION

In time divisional multiple access TDMA trunking system such as that being developed as TETRA (Trans European Trunked Radio) there are mobile stations which can operate in Trunked Mode (TMO) or Direct Mode (DMO). In TMO the mobile station communicates via a base-station whilst in DMO the mobile station establishes communication directly with another mobile station.

DMO is particularly useful where one mobile station is outside the area of coverage of the base-station, and is thus unable to use the trunking system, or if the trunking system has failed perhaps by the system crashing.

Usually TMO is used but the mobile station is provided with a switch to enable the operation to be switched to DMO manually or automatically.

A problem occurs where a talk group of a number of mobile stations is operating in TMO and a further mobile station moves outside the coverage of the trunking system still wishes to communicate with the group.

The talk group members will be unaware of the mobile station outside the coverage of the trunking system.

It is an object of the invention to provide a method by means of which a mobile outside the area of coverage of a trunking system can establish communication with a talk group operating in TMO.

SUMMARY OF THE INVENTION

According to the invention there is provided a method of establishing communication between at least one mobile in a talk group of mobiles communicating in trunk mode operation and a further mobile not operating in trunk mode operation which method comprising the steps of:

allocating a trunk mode operation channel comprising a number of transmission slots;

allocating a direct mode operation channel comprising a number of transmission slots;

transmitting from at least one of the talk group a message in a time slot of the direct mode operation channel indicative of a trunk mode operation call being in operation;

monitoring by at least one of the talk group a direct mode request slot allocated on the direct mode operation channel;

in response to receiving the message by the further mobile, the further mobile:

determining the timing of the trunk mode operation channel from the message or messages; and transmitting a direct mode operation call connection request on the direct mode operation channel during the direct mode operation request slot and in response to one of the talk group members receiving the direct mode operation request switching at least one of the talk group to direct mode operation and establishing contact with the further mobile.

By the at least one of the talk group mobiles transmitting a message indicative of a TMO call being in operation on the DMO channel, the further mobile is made aware of a TMO call being in operation. The further mobile will determine from the message or a number of messages the timing of the TMO channel. This will then enable the further mobile to transmit on an appropriate slot a request for a DMO connection to the talk group. Then all or some of the members will switch to the DMO channel for further communications.

Preferably, the at least one of the talk group transmits a message at regular intervals. This is preferable because the further mobile with a knowledge of the intervals will be able to deduce the timing of the TMO channel in a very straightforward way.

BRIEF DESCRIPTION OF THE DRAWINGS

A specific embodiment of the invention will now be described, by way of example only, with reference to the drawings of which:

FIGS. 3 to 5 are explanatory diagrams showing an arrangement of slots in channels allocated to the two modes.

DETAILED DESCRIPTION OF THE PREFERRED EMBODIMENT

Figure 1:
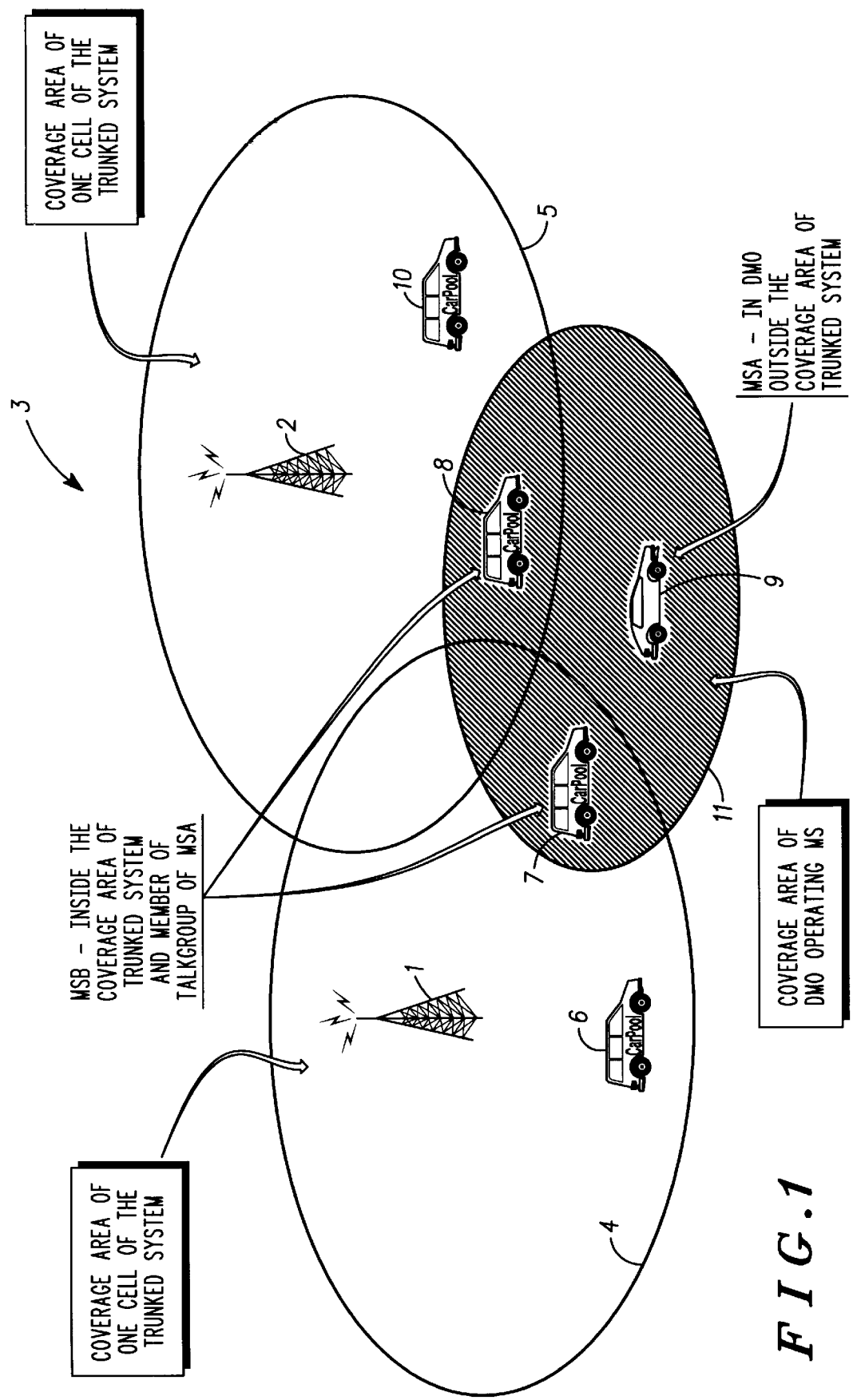
FIG. 1 shows a communication system operating in accordance with the invention.

With reference to FIG. 1, there is shown two base-stations 1 and 2 of a TETRA communication system 3. Each base-station has range of coverage as depicted by the peripheral lines 4 and 5. Beyond those lines a mobile is unable to establish contact with the base-stations and is thus unable to utilize the trunking mode operation supported by the base-stations.

There are a number of mobile stations 6 to 10 operating in the system 3. All except mobile 9 are within range of at least one base-station. Mobiles 6 and 7 are within range of base-station 1 and mobiles 8 and 10 are within range of base-station 2.

Mobiles 7, 8 and 9 belong to the same talk group. Mobiles 7 and 8, because they are within the range of coverage of respective base-stations are able to communicate by trunk mode operation (TMO). Mobile 7 transmits to the base-station 1 where the transmission is de-coded, corrected and re-coded and transmitted to base-station 2. Base-station 2 then transmits the message to mobile 8. Transmissions from mobile 8 to mobile 7 are relayed by base-stations 2 and 1 in a similar way.

The mobile 9 is unable to operate in TMO because it is outside the range of coverage of the base-stations. Thus, if it is to communicate with mobiles 7 and 8 it will have to operate in direct mode operation (DMO). This is possible because mobiles 7 and 8 are within the range of coverage of mobile 9 the boundary of which is indicated by line 11.

Figure 2:
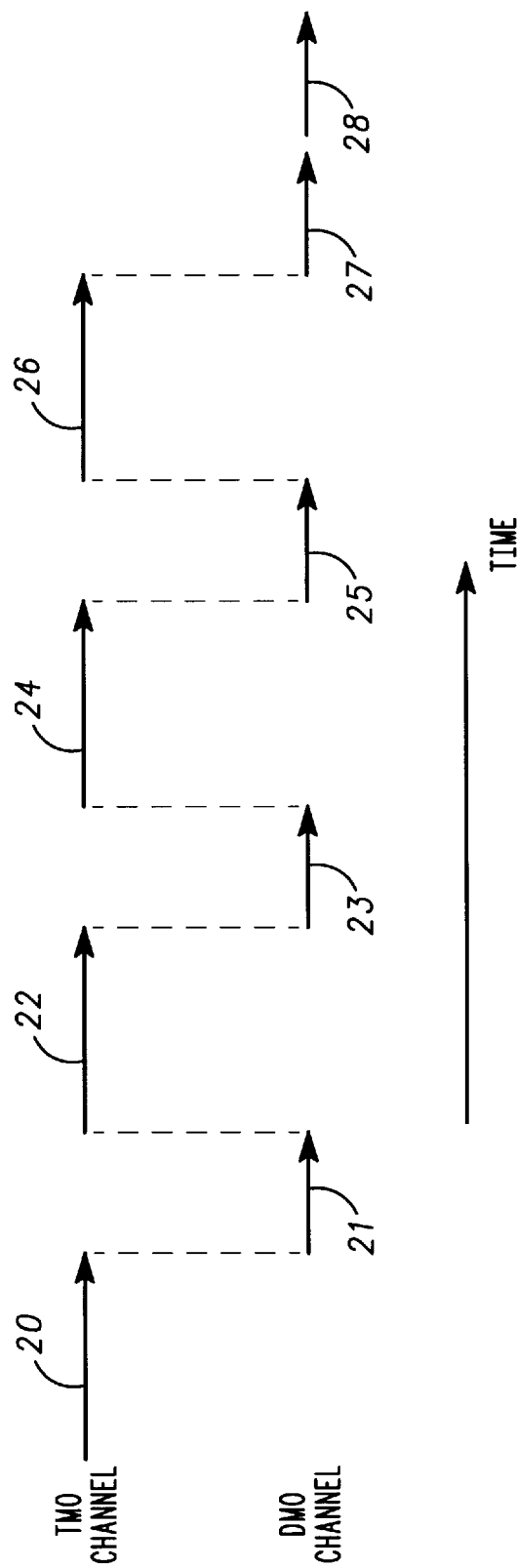
FIG. 2 is an explanatory diagram showing switching of units of the system between two communication modes.

A broad overview of the method of operation will be firstly given with reference to FIG. 2. FIG. 2 depicts activities on two channels, the TMO channel and DMO channel as time progresses from left to right. The TMO channel is established by a controller of the system which in this embodiment is located in the base-station 1. Mobiles 7 and 8 interact on the TMO channel as indicated by arrow 20 then they both switch to the DMO channel and transmit a burst which is indicative of there being a TMO call in existence and its timing. They then listen for any response to this burst by mobiles outside the area of TMO (The response being transmitted on the DMO channel. These activities are represented by arrow 21. After the activities on the DMO channel, the mobiles switch back to the TMO channel and continue with their interaction as represented by arrow 22. This switching activity will continue as shown by arrows 23 to 26 until a DMO request burst is received.

This occurs during activity 27 in the DMO channel and then the communication on the DMO channel proceeds as indicated by arrow 28.

Figure 3:
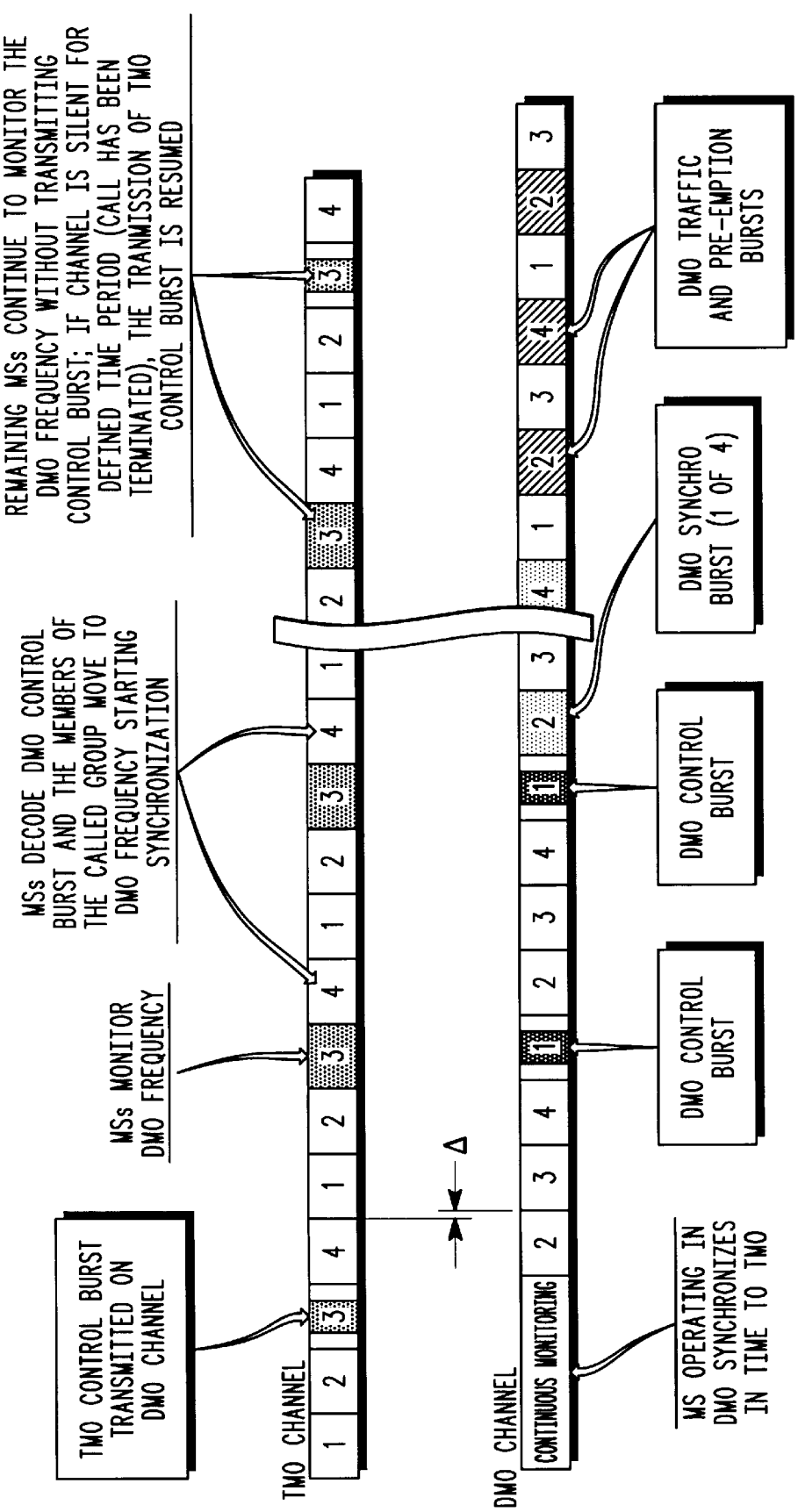
Figure 4:
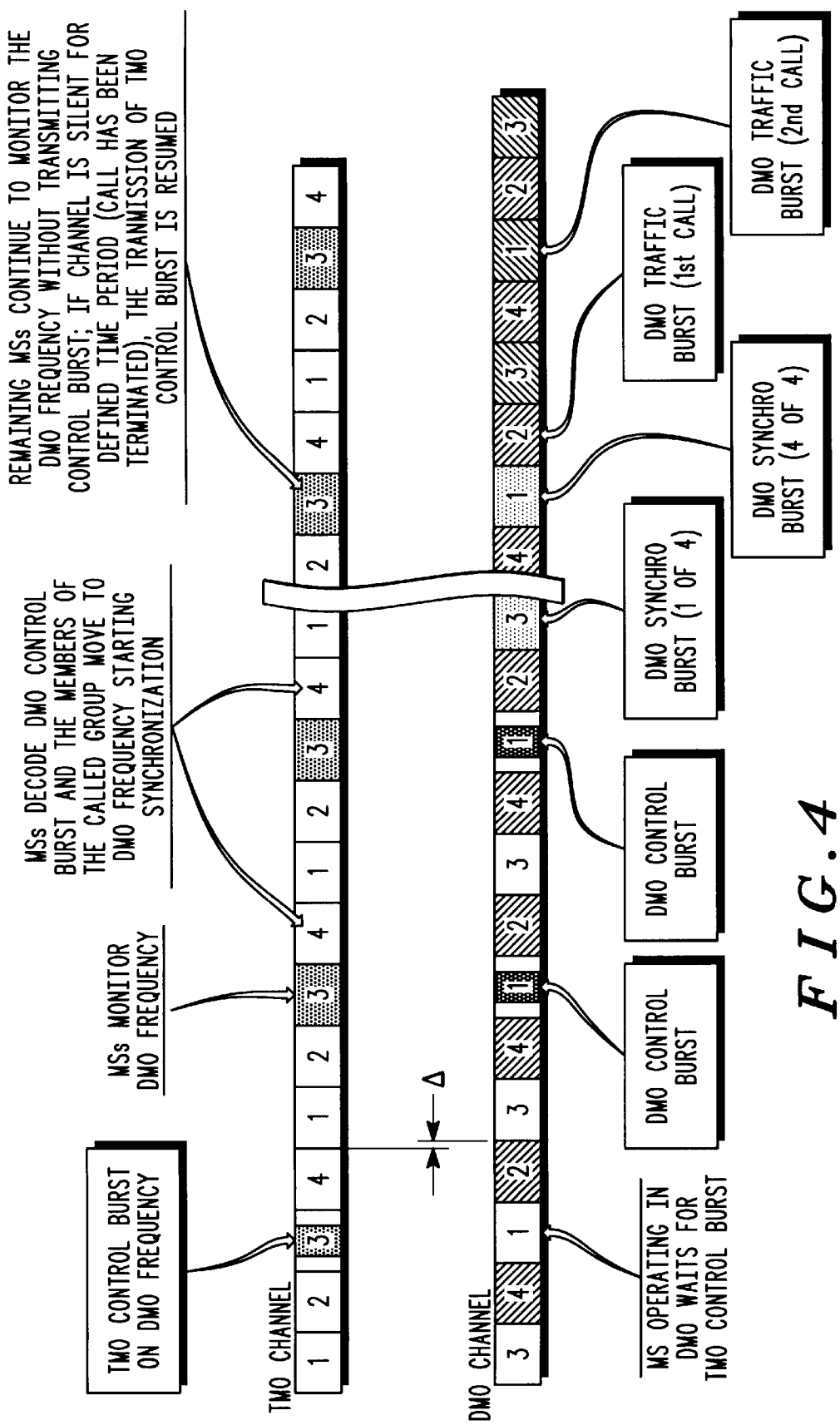

The operation will now be described in detail with reference to FIG. 3. The TMO channel is subdivided into a number of slots in this case four although there may be many more. The subdivision being governed by the system controller as is the frequency given to the channel. Each four slots represents a frame. During slot 3 of every fourth frame the mobiles operating in trunk mode transmit a TMO control burst on the DMO channel. Mobile 9 continuously monitoring the DMO channel will receive the TMO bursts and determine from their separation the synchronization of the system.

The bursts will not be received simultaneously because of propagation delays so the TMO control burst is less than one slot in duration. Mobile 9 will then be in a position to be able to transmit a DMO request synchronized with the period during which the mobiles 7 and 8 will be monitoring for such a request (which in essence is a request for connection to be made).

The DMO request is transmitted as a DMO control burst during slot 1 of the DMO channel (slot 1 of the DMO channel coincides with slot 3 of the TMO channel). Note that the burst is again less than one slot duration to cater for mismatch.

Thus, in essence, a slot structure aligned with that on the TMO channel is established.

The mobiles monitor during slot 3 of the TMO channel the DMO channel and will thus receive the DMO request from mobile 9. The DMO request includes a group identifier so that only mobiles of the talk group are affected. These mobiles will then switch to the DMO channel and a DMO call is established by synchronization bursts on slot 2 for four frames followed by DMO traffic and pre-emption bursts on slots 2 and 4.

The mobiles not part of the talk group will detect a call taking place on the DMO channel and will then cease transmitting the TMO control burst. This will allow slot 3 to be used for DMO communication if necessary. The TMO control burst will be re-started when the DMO channel is silent indicating the call has been cleared.

FIG. 2 illustrates the setting up of a first DMO call. It will be seen that this utilizes only two of the four slots available in the DMO channel, that is to say slots 1 and 3 are available to carry a further call. The way in which the further call is established will now be described with reference to FIG. 5.

A mobile operating in DMO and wishing to establish a call in DMO will monitor the DMO channel and detects that there is already an existing DMO call in slots 2 and 4. It will also detect that no call is present in slots 1 and 3 and will also establish the timing of the DMO channel.

The mobile will wait for the occurrence of a TMO control burst. If no such burst is received within a predetermined time it will conclude that there are no further mobiles which are operable in DMO that are operating in TMO. It may however still attempt to establish a DMO call in case any of its talkgroup members are already in DMO.

If the mobile receives a TMO control burst, it transmits a DMO control burst on slot 3 of the TMO channel. As before the mobiles operating on the TMO channel which are members of this talkgroup will then switch to the DMO channel and a call will be established in slots 1 and 3. Mobiles which are not part of the talkgroup will then cease transmitting the TMO control bursts because there are no available slots for these transmissions on the DMO channel.

When calls clear on the DMO it is advantageous to ensure that slot 3 of the DMO channel is free. Obviously if the second call clears first then slot 3 will as a consequence become free. Then the TMO control burst can be transmitted on this slot as before. However, if the first call clears first then the system transfers the second call to slots 2 and 4 thus freeing slot 3. This is achieved by the master mobile of the first call transmitting on a pre-emption slot of slot 1 a message indicative of the call being cleared. In response to this message the master mobile of the second call will transmit a message to the other mobiles involve in the second call to move to slots 2 and 4. This process is illustrated in FIG. 5.

What is claimed is:

1. A communication method for establishing communication between at least one mobile in a talk group of mobiles communicating in trunk mode operation and a further mobile not operating in trunk mode operation which method comprising the steps of:

allocating a trunk mode operation channel comprising a number of transmission slots;

allocating a direct mode operation channel comprising a number of transmission slots;

transmitting from at least one of the talk group a message in a time slot of the direct mode operation channel indicative of a trunk mode operation call being in operation;

monitoring by the talk group a direct mode operation request slot allocated on the direct mode operation channel;

in response to receiving the message by the further mobile, the further mobile:
   determining the timing of the trunk mode operation channel from the message or messages; and
   transmitting a direct mode operation call connection request on the direct mode operation channel during the direct mode operation request slot and in response to one of the talk group members receiving the direct mode operation request switching at least one of the talk group to direct mode operation and establishing contact with the further mobile.

2. A method as claimed in claim 1 wherein the message indicative of there being a trunk mode operation call being in operation is transmitted in a predetermined slot of the direct mode operation.

3. A method as claimed in claim 2 wherein upon clearance of a direct mode call the slots are allocated to direct mode calls such that the predetermined slot is free.

* * * * *